UNITED STATES PATENT OFFICE.

MAURICE CHARLES MARIE TIXIER, OF PARIS, FRANCE.

PROCESS OF OBTAINING TAR EXTRACT.

SPECIFICATION forming part of Letters Patent No. 722,336, dated March 10, 1903.

Application filed May 16, 1902. Serial No. 107,677. (No specimens.)

*To all whom it may concern:*

Be it known that I, MAURICE CHARLES MARIE TIXIER, chemical engineer, a citizen of the Republic of France, and a resident of No. 11 Avenue du Maine, Paris, in the Republic of France, have invented a certain new and useful Improved Process of Obtaining in One Operation All the Extracts Soluble in Water Contained in Tar, of which the following is a specification.

The present invention relates to an economical process for obtaining by means of a single operation all extracts or by-products soluble in water which are contained in tar, and more particularly in wood-tar.

Briefly speaking, the said process consists in melting at a temperature of from 60° to 100° centigrade, varying with the kind of tar, a mixture of tar and commercial alkaline carbonate, said mixture being obtained by adding the alkaline carbonate to the tar in a receptacle in which the tar has been heated until the effervescence ceases, then adding sufficient cold water to dissolve the products in soluble combination, then decanting, precipitating by means of an acid, and mixing the precipitate obtained with a determined quantity of alkaline carbonate, by which the extract soluble in water and containing all the soluble constituents of the tar used is produced.

The process is very economical, since the heat acts only on masses strictly reduced to a minimum.

The product obtained is a combination soluble in water of all the soluble extracts of the tar. It is produced in the form of paste, and this can be so transformed by known means as to form a dry and powdered or liquid product, as desired.

The operation of the process in detail is as follows: A certain quantity of tar—say, for instance, one hundred kilograms—is placed in its natural state in a receptacle heated to a temperature not exceeding 100° centigrade. A commercial alkaline carbonate in a dry state—say, for instance, carbonate of soda—is then progressively added until the effer-
vescence ceases. So long as the reactions are going on there is effervescence, and when the latter ceases the operation is terminated. The maximum of combination possible for the different amounts of soluble constituents in the tar will always be obtained by a temperature between 60° and 100° centigrade; but the exact desirable degree must be determined by practice, and it will always be the same for each composition. It is estimated for each kind of tar by making successive experiments on a specimen or sample of the said tar. When the effervescence is terminated, sufficient water for dissolving the products' in soluble combination is added to the mass in a cold state—say about ten times its weight (an excess of water is not injurious)—and the mixture is then decanted. The liquid thus resulting is then treated by an acid, such as sulfuric acid, and a precipitate is thus obtained. The quantity of acid is determined by pouring same in until no more precipitate is produced. The precipitate obtained is washed, dried, and then mixed, as in the first operation, with a determined quantity of carbonate of soda in order to reform a soluble combination, the whole being heated, as in the first operation. Through the influence of this heat the precipitate and the carbonate of soda melt and combine together, letting the carbonic-acid gas escape. A soluble salt of soda is consequently obtained, the acid of which is furnished by the tar. The product obtained after reaction constitutes the extract soluble in water, which extract contains all the soluble constituents of the tar used.

Having now particularly described and ascertained the nature of my said invention and in what manner the same is to be performed, I declare that what I claim is—

A process for obtaining by means of a single operation all extracts soluble in water contained in tar, consisting in melting at a temperature between 60° and 100° centigrade a mixture of tar and commercial alkaline carbonate, said mixture being obtained by progressively adding until the effervescence ceases, the alkaline carbonate, in the receptacle in which the tar is heated, adding then, in a cold state, sufficient water to dissolve the products in soluble combination, without avoiding an excess of water, decanting, precipitating the liquid thus obtained by means of an acid, and finally mixing, in a hot state, the precipitate obtained with a quantity of alkaline carbonate progressively added until the effervescence ceases, substantially as and for the purpose set forth.

In witness whereof I have hereunto set my hand in presence of two witnesses.

MAURICE CHARLES MARIE TIXIER.

Witnesses:
ANTOINE LAVOIX,
EDWARD P. MacLEAN.